Patented June 29, 1943

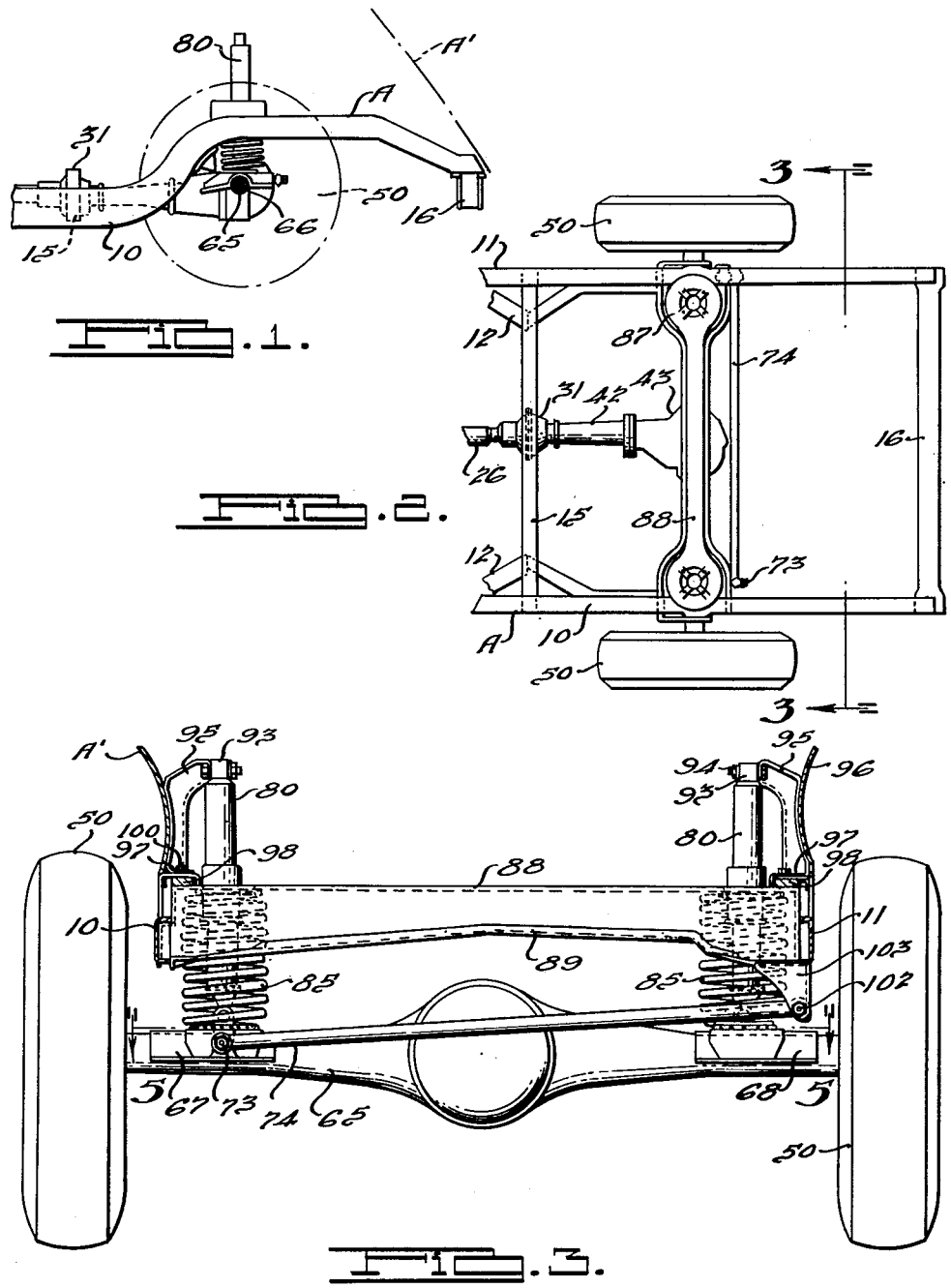

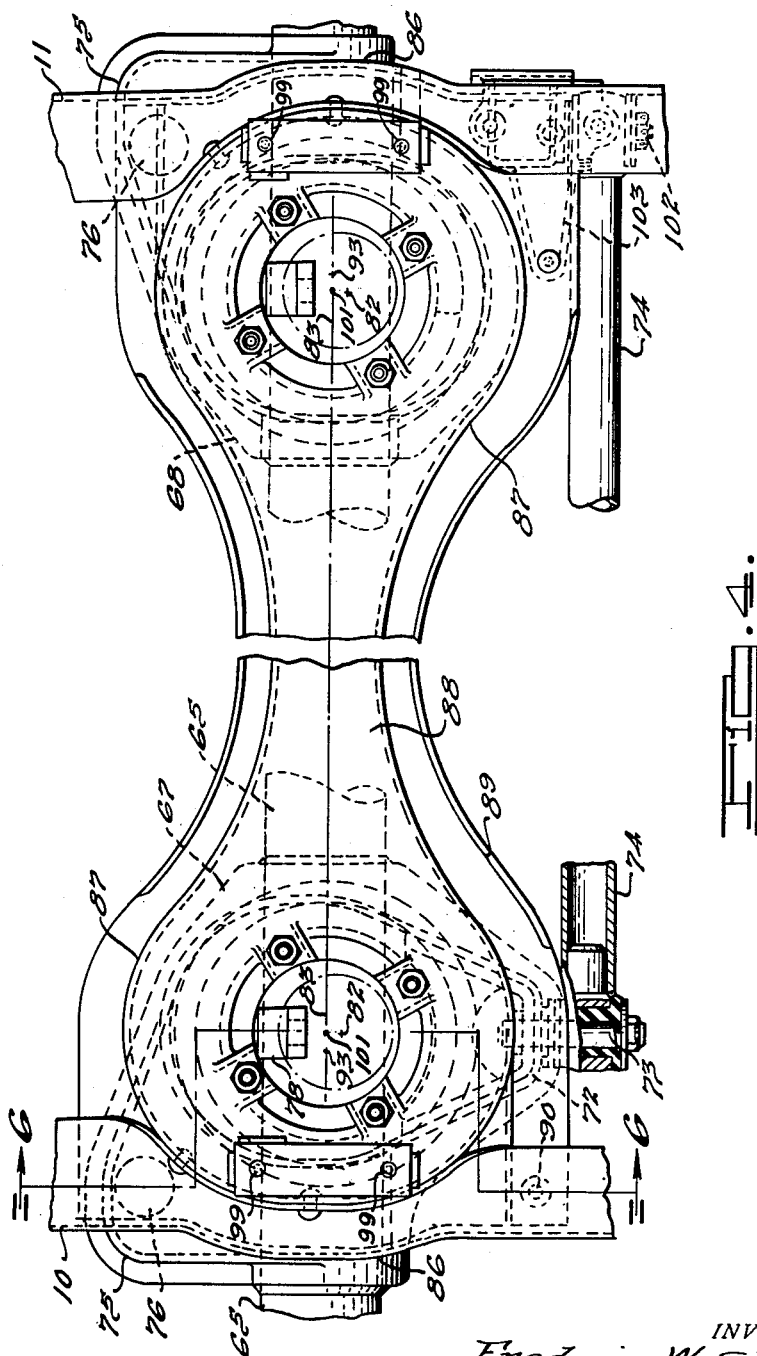

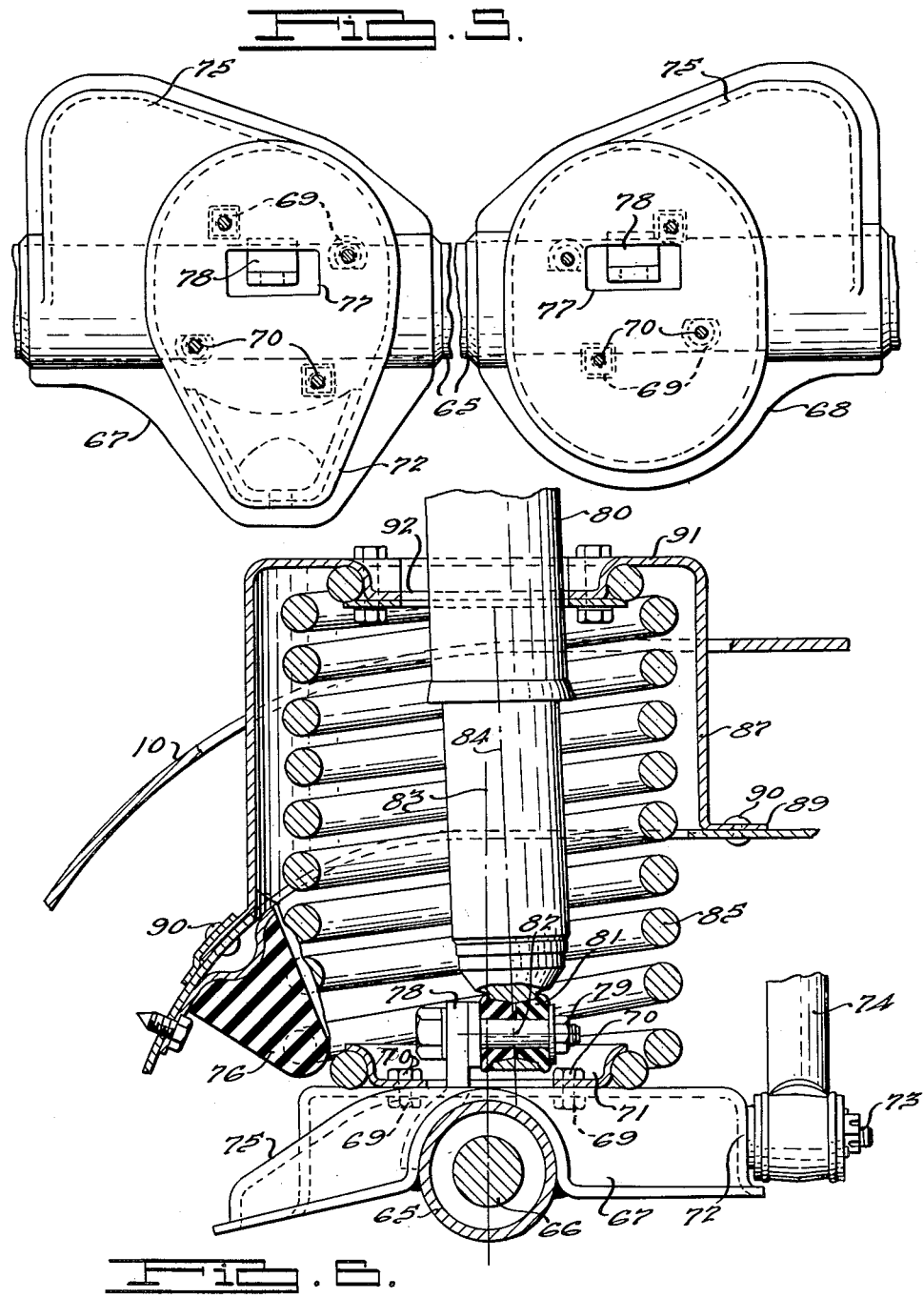

2,322,890

UNITED STATES PATENT OFFICE 2,322,890

VEHICLE WHEEL SUSPENSION

Frederic W. Slack, Detroit, Mich., assignor to Chrysler Corporation, Highland Park, Mich., a corporation of Delaware Original application July 14 1941, Serial No. 402,297. Divided and this application November 14, 1941, Serial No. 419,077

6 Claims. (Cl. 280—124)

This invention relates to motor vehicles and refers more particularly to improvements in suspension or springing for the vehicle ground wheels.

This application is a division of my copending application Serial No. 402,297, filed July 14, 1941.

An object of my invention is to provide an improved wheel suspension affording simplification and improved riding characteristics.

Another object is to provide a simplified coil spring suspension system especially adapted for the vehicle rear wheels and axle.

A further object is to provide a simplified and direct-acting system of coil spring and shock absorber assembly.

Further objects and advantages of my invention reside in the novel combination and arrangement of parts more particularly hereinafter described in detail in connection with one embodiment which my invention may assume, reference being had to the accompanying drawings in which:

Fig. 1 is a side elevational view of the rear portion of a motor vehicle chassis illustrating my suspension.

Fig. 2 is a top plan view of the Fig. 1 structure.

Fig. 3 is a rear sectional elevational view looking forwardly at the rear wheel suspension, the view being taken as indicated by line 3—3 of Fig. 2.

Fig. 4 is a top plan view showing the rear wheel suspension, portions at the central region being broken away.

Fig. 5 is a plan view illustrating the rear axle housing spring seats, the view being taken as indicated by line 5—5 of Fig. 3.

Fig. 6 is an enlarged transverse sectional elevational view illustrating one of the coil spring and shock absorber mountings, the view being taken approximately as indicated by line 6—6 of Fig. 4 but showing the lower spring seat bracket in elevation.

Referring to the drawings, I have illustrated my motor vehicle as being of the type having a chassis frame A although, if desired, the chassis frame may be incorporated as a unitary part of the body structure A' within keeping of the broader aspects of my invention. In either event it is desirable to provide side frame longitudinals of some form mounted as sprung weight on the wheels. Frame A comprises a pair of main side channel rails 10, 11 being appropriately reinforced by the box-in channel members 12 and having cross brace structures 15 and 16.

The drive to the rear ground wheels passes from a propeller shaft 26 to a constant velocity universal joint in housing 31 which is fixed to cross member 15. The differential drive shaft in housing 42 is driven from this universal joint, the housing 42 being secured at its rear end to the differential housing 43 as more particularly set forth in my copending application aforesaid. Housings 42, 43 have universal pivotal support at universal joint 31 while propeller shaft 26 is held against up and down movement. This arrangement provides a torque tube drive for the vehicle rear ground wheels 50 such that brake and drive reaction is taken through swinging unitary housing parts 43 and 42 thence to the spherically jointed parts of housing 31 and cross member 15. Wheels 50 may rise and fall with the aforesaid swinging unit, being guided for vertical swinging about the center of the universal point at 31.

Securely fixed to the differential housing part 43 is the rear axle housing 65 for mounting wheels 50 and for housing the wheel drive shafts 66 which receive drive from differential in the customary manner. Welded to housing 65 are the spring support brackets 67, 68 (Fig. 5) each being in the form of a downwardly cupped stamping provided with a plurality of threaded openings and aligned nuts 69 welded to the bottom face of each of the brackets for receiving the stud bolts 70 whereby to attach a lower spring clamp 71 to the bracket.

Bracket 67 has a rearward projection 72 carrying a fastener assembly 73 (Figs. 4 and 6) for mounting one end of a transversely extending stabilizer bar 74, the other end of which is connected to the side rail 11. Each of the brackets 67 and 68 has a forward projection 75 adapted to engage a jounce rubber bumper 76 (Figs. 4 and 6) depending from the lower flange of each side rails for limiting movement of the axle housing 65 upwardly toward the side rails. Each of the brackets 67 and 68 also has an opening 77 through which a support 78 extends from welded connection with axle housing 65 upwardly to carry the fastener assembly 79 for mounting the lower end of an upstanding hydraulic shock absorber 80 of the telescoping type. Each shock absorber preferably has a rubber bushing mounting 81 so arranged that the center point of movement of the lower end of the shock absorber on the fastener 79 lies at point 82 which is spaced rearwardly from the transverse vertical plane 83 containing the axis of shafts 66 and housing 65.

The axis 84 of the shock absorber inclines upwardly and forwardly toward plane 83.

Each bracket 67, 68 supports the lower end of a coil spring 85 whose vertical axis lies approximately in plane 83 such that the shock absorber pivot 82 is offset longitudinally from the axis of the coil spring which surrounds the lower portion of the shock absorber. At the region of the coil springs, each frame side rail 10, 11 is bowed laterally outwardly at 86 (Fig. 4) for accommodating a coil spring 85 and for riveted connection with the hollow cylindrical end portion 87 of the cross brace 88 having the bottom outwardly directed marginal stiffening flange 89 riveted at its ends to the bottom flange of the side rails as at 90 (Fig. 6). A spring 85 has its upper end extending into a cylindrical portion 87 and seated on the upper wall 91 thereof, this wall having an opening 92 through which a shock absorber 80 extends for connection at point 93 with the fastener 94 carried by a bracket 95 which extends downwardly along the wheel house 96 in welded engagement therewith and then terminates in an inturned flange 97 seated on a steel block 98 (Figs. 3 and 6) welded to the wall 91 adjacent frame portion 86. The block 98 affords a means for bolting the bracket 95 to cross member 88, each block having threaded openings 99 for receiving a fastener 100 passing through flange 97. Thus the upper supports for the shock absorbers are firmly supported and structurally tied with the wheel houses and cross brace 88 at regions of maximum rigidity adjacent the side rails.

In addition to the lower shock absorber support points 82 being offset longitudinally rearwardly from the transverse plane 83 containing the axes of coil springs 85 and shafts 66, the upper support points 93 of the shock absorbers are also offset laterally outwardly from the coil spring axes 101. This arrangement compensates for the rising and falling of the wheels about the point of swing at 31 and when one wheel rises and falls relative to another without causing any binding of the shock absorbers at openings 92 or without requiring undesirably large diameter coil springs 85 or openings 92.

Referring to the stabilizer bar 74 having one end thereof connected to axle housing 65 at the bracket projection 72, this stabilizer bar has its opposite end connected at fastener 102 (Figs. 3 and 4) mounted on a bracket 103 which is securely attached to the flange 89 of cross member 88 and to the side rail 11 at the juncture of these frame parts and rearwardly adjacent the right coil spring housing 87.

The arrangement of my novel rear wheel torque tube type of drive and cooperating suspension provides for taking drive thrust and brake reaction at the frame cross member 15 thereby leaving the propeller shaft free for driving function.

I claim:

1. In a motor vehicle having a ground wheel, a transversely extending wheel carrying structure adapted for rising and falling movements with the wheel, means for guiding said wheel support structure for swinging movement, a frame structure adapted for springing support by said wheel carrying structure, said frame structure comprising a spring support having an opening therethrough, a second spring support carried by said wheel carrying structure, a coil spring between said spring supports for springing said frame structure on said wheel carrying structure, a tubular shock absorber having its lower end portion disposed within said coil spring and projecting upwardly through said opening, means fixed with respect to said frame structure for providing an articulated support for the upper end of said shock absorber above said coil spring, means fixed with respect to said wheel carrying structure for providing an articulated support for the lower end of said shock absorber, the center of articulation of one of said shock absorber support means being disposed, when said coil spring is in its static condition, in offset relationship longitudinally of the vehicle with respect to a plane extending transversely of the vehicle and containing the axis of said coil spring and lying perpendicular to the longitudinal vertical midplane of the vehicle, the center of articulation of the other of said shock absorber support means being disposed, when said coil spring is in its static condition, in offset relationship transversely of the vehicle with respect to a plane parallel to said mid-plane and containing the axis of said coil spring.

2. In a motor vehicle having a pair of ground wheels, a rigid transversely extending support for mounting said wheels, a frame structure adapted to be sprung on said wheel support, means for guiding swinging movement of said wheel support to accommodate rising and falling of said wheels relative to said frame structure, a pair of spring support brackets secured to said wheel support, a coil spring rising from each of said brackets, said frame structure comprising a pair of longitudinally extending side rails and a cross brace transversely connecting said rails, said cross brace comprising a downwardly channeled member having enlarged generally cylindrical end portions respectively secured to said rails receiving the upper ends of said coil springs for seating therein.

3. In a motor vehicle according to claim 2, one of said spring support brackets having a longitudinally extending projection, a bracket projecting from one of said rails, and a stabilizer rod extending between said bracket projection and said rail bracket.

4. In a motor vehicle having a pair of ground wheels, a rigid transversely extending support for mounting said wheels, a frame structure adapted to be sprung on said wheel support, means for guiding swinging movement of said wheel support to accommodate rising and falling of said wheels relative to said frame structure, a pair of spring support brackets secured to said wheel support, a coil spring rising from each of said brackets, said frame structure comprising a pair of longitudinally extending side rails and a cross brace transversely connecting said rails, said cross brace having a pair of openings and portions bounding said openings for respectively seating the upper ends of said coil springs, a shock absorber extending through each of said openings for connection to said wheel support, a pair of blocks attached to said cross brace, and a bracket rising from each of said blocks for connection with the upper end of one of said shock absorbers.

5. In a motor vehicle having a pair of ground wheels, a rigid axle housing for mounting said wheels, a pair of stamped spring support brackets seated on said housing, each of said brackets having an opening therethrough, a pair of support members seated on said housing and projecting through said bracket openings respectively, a frame structure to be sprung, coil springs between said frame structure and each of said support brackets respectively, and shock absorbers operably connected between said frame structure and said support members.

6. In a motor vehicle having a pair of ground wheels and associated wheel house members, a rigid axle housing for mounting said wheels, a frame structure including a cross brace extending transversely of the vehicle above said housing, coil springs between said cross brace and housing, a shock absorber rising from said housing through each of said coil springs, and a bracket support for the upper end of each of said shock absorbers, each of said bracket supports having a portion thereof attached to one of said wheel house members and a second portion thereof attached to said cross brace.

FREDERIC W. SLACK.